United States Patent
Bekiares et al.

(10) Patent No.: US 8,774,207 B2
(45) Date of Patent: Jul. 8, 2014

(54) METHODS FOR BEARER RESERVATION, MAINTENANCE, AND USE IN A COMMUNICATION SYSTEM

(75) Inventors: Tyrone D. Bekiares, Chicago, IL (US); Anatoly Agulnik, Deerfield, IL (US); Trent J. Miller, West Chicago, IL (US); James M. Nowakowski, Buffalo Grove, IL (US); Steven D. Tine, Buffalo Grove, IL (US); Peter E. Thomas, Schaumburg, IL (US); Daniel S. Griesmann, Villa Park, IL (US); Aparna Pandey, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 195 days.

(21) Appl. No.: 13/194,378

(22) Filed: Jul. 29, 2011

(65) Prior Publication Data
US 2012/0027025 A1    Feb. 2, 2012

Related U.S. Application Data

(60) Provisional application No. 61/369,698, filed on Jul. 31, 2010.

(51) Int. Cl.
*H04L 12/28*    (2006.01)
(52) U.S. Cl.
USPC ........................................................ 370/431
(58) Field of Classification Search
USPC ........... 370/329, 341, 431; 455/450, 464, 509
See application file for complete search history.

(56) References Cited

U.S. PATENT DOCUMENTS

| | | | | |
|---|---|---|---|---|
| 5,563,882 A | * | 10/1996 | Bruno et al. | 370/260 |
| 6,668,175 B1 | * | 12/2003 | Almgren et al. | 455/522 |
| 6,674,733 B1 | * | 1/2004 | Huusko | 370/329 |
| 7,107,054 B2 | * | 9/2006 | Florkey et al. | 455/436 |
| 7,197,328 B2 | * | 3/2007 | Hart et al. | 455/522 |

(Continued)

FOREIGN PATENT DOCUMENTS

| | | |
|---|---|---|
| EP | 1701487 A1 | 9/2006 |
| EP | 2124386 A1 | 11/2009 |
| WO | 2005096655 A1 | 10/2005 |
| WO | 2008116502 A1 | 10/2008 |

OTHER PUBLICATIONS

3GPP TS 23.107, ver. 9.0.0, Rel. 9, Jan. 2010.*
3GPP TS 23.401, ver. 9.2.0, Rel. 9, Oct. 2009.*

(Continued)

*Primary Examiner* — Mark Rinehart
*Assistant Examiner* — Peter Solinsky
(74) *Attorney, Agent, or Firm* — Steven May

(57) ABSTRACT

A method for bearer reservation, maintenance, and use in a communication system is performed by an intermediary function (IF) in the enterprise network. The IF processes a user plane reservation request for a flow of user plane data from a sourcing device, and determines a set of bearers to transport the flow of user plane data. The IF requests from at least one access network the determined set of bearers, and receives from the at least one access network an allocated set of bearers, wherein the allocated set of bearers comprises one or more bearers. The IF receives the flow of user plane data from the sourcing device. The IF receives an indication that at least one of the bearers in the allocated set of bearers is unavailable, and prevents at least a portion of the flow of user plane data from being transmitted over the default bearer.

23 Claims, 6 Drawing Sheets

(56) References Cited

U.S. PATENT DOCUMENTS

| | | | |
|---|---|---|---|
| 7,359,710 B2* | 4/2008 | Benco et al. | 455/452.2 |
| 7,436,827 B2* | 10/2008 | Greis et al. | 370/389 |
| 7,929,466 B2* | 4/2011 | Tillotson | 370/278 |
| 8,266,296 B2* | 9/2012 | Dowling et al. | 709/227 |
| 8,305,922 B2* | 11/2012 | Cuervo | 370/252 |
| 8,346,161 B2* | 1/2013 | Sogabe et al. | 455/12.1 |
| 8,433,794 B2* | 4/2013 | Baniel et al. | 709/224 |
| 2002/0054597 A1* | 5/2002 | O'Toole et al. | 370/395.41 |
| 2003/0093459 A1* | 5/2003 | Dowling et al. | 709/201 |
| 2006/0104296 A1* | 5/2006 | Rodrigo | 370/403 |
| 2007/0217435 A1* | 9/2007 | Crocker et al. | 370/401 |
| 2008/0123660 A1* | 5/2008 | Sammour et al. | 370/395.21 |
| 2009/0070469 A1* | 3/2009 | Roach et al. | 709/226 |
| 2009/0086705 A1* | 4/2009 | Zisimopoulos et al. | 370/347 |
| 2009/0116440 A1* | 5/2009 | Zhao et al. | 370/329 |
| 2009/0168646 A1* | 7/2009 | Wang et al. | 370/225 |
| 2009/0239526 A1* | 9/2009 | Zhao et al. | 455/424 |
| 2010/0165836 A1* | 7/2010 | Wahlqvist et al. | 370/225 |
| 2010/0232393 A1* | 9/2010 | Shuai et al. | 370/331 |
| 2010/0284299 A1* | 11/2010 | Bi et al. | 370/253 |
| 2011/0075744 A1* | 3/2011 | Laselva et al. | 375/259 |
| 2012/0026970 A1* | 2/2012 | Winters et al. | 370/330 |
| 2012/0046058 A1* | 2/2012 | Vesterinen et al. | 455/509 |
| 2012/0163300 A1* | 6/2012 | Wang et al. | 370/328 |
| 2012/0250509 A1* | 10/2012 | Leung et al. | 370/235 |
| 2012/0250650 A1* | 10/2012 | Brombal et al. | 370/329 |
| 2012/0257499 A1* | 10/2012 | Chatterjee et al. | 370/232 |
| 2012/0263036 A1* | 10/2012 | Barclay et al. | 370/230 |
| 2012/0289232 A1* | 11/2012 | Ostrup et al. | 455/436 |
| 2012/0327779 A1* | 12/2012 | Gell et al. | 370/238 |
| 2013/0044732 A1* | 2/2013 | Hu et al. | 370/331 |
| 2013/0051334 A1* | 2/2013 | Sammour et al. | 370/329 |
| 2013/0055016 A1* | 2/2013 | Charles et al. | 714/15 |
| 2013/0094483 A1* | 4/2013 | Marinier et al. | 370/336 |
| 2013/0294372 A1* | 11/2013 | Ishii et al. | 370/329 |

OTHER PUBLICATIONS

3GPP TS 24.301, ver. 9.1.0, Rel. 9, Apr. 2010.*
3GPP TS 29.213, ver. 9.1.0, Rel. 9, Jan. 2010.*
3GPP TS 29.274 9.1.0, Rel. 9, Jan. 2010.*
ETSI, GSM 05.05, Radio transmission and reception, Mar. 1996.*
PCT International Search Report Dated Nov. 7, 2011.
Naim G. et al. "Enhancements to QOS Management for Real Time Radio Bearers in 3G Cellular Systems", Wireless Communications and Networking Conference, 2000, WCNC, 2000, IEEE Sep. 23-28, 2000, Piscataway, NJ; vol. 3, p. 1547-1551, XP010532780; ISBN:978-0-7803-6596-4.
PCT International Search Report Dated Dec. 23, 2011 for Related U.S. Appl. No. 13/194,299.
3rd Generation Partnership Project: Technical Specification Group Services and System Aspects; General Packet Radio Service (GPRS) Enhancements for Evolved Universal Terrestrial Radio Access Network (E-UTRAN) Access (Release 10), 3GPP Standard; 3GPP TS 23.401, Mobile Competence Centre; France; No. V10.1.0; Sep. 29, 2010, pp. 1-271; XP050442333.
FRF.16.1 Multilink Frame Relay UNI/NNI Implementation Agreement; Frame Relay Forum Technical Committee; May 2002; 40 Pages.

* cited by examiner

METHODS FOR BEARER RESERVATION, MAINTENANCE, AND USE IN A COMMUNICATION SYSTEM

REFERENCE TO RELATED APPLICATION

The present application is related to the following U.S. application commonly owned together with this application by Motorola Solutions, Inc.: Ser. No. 13/194,299 filed Jul. 29, 2011, titled "Multi-bearer Rate Control for Transporting User Plane Data" by Tine.

TECHNICAL FIELD

The technical field relates generally to communication systems and more particularly to methods for bearer reservation, maintenance, and use in a communication system.

BACKGROUND

Some communication networks (such as Long Term Evolution (LTE)), which comprise a set of enhancements to the Universal Mobile Telecommunications System (UMTS) as is described in a suite of Technical Specifications (TS) developed within and published by the $3^{rd}$ Generation Partnership Project (3GPP)) grant a default bearer to a device upon the device connecting to the network. The default bearer only provides for a "best effort" delivery of all unclassified traffic, inclusive of media streams, with few if any guarantees of Quality of Service (QoS). However, some real-time media applications such as voice, video streaming, etc. need a minimum guaranteed QoS associated with the network bearer used to transport the media in order to present the media to the receiving user with acceptable quality. To accommodate this need, in addition to providing the default bearer, the network further provides a mechanism that allows requesting an allocation of a bearer having a guaranteed minimum QoS for media transport.

Conventional approaches to bearer reservation attempt to allocate, for a given media stream, a single bearer supporting the required throughput. When the network is congested, however, the reserved bearer reservation may be rescinded. Revocation of an allocated bearer may result in the media stream being redirected to the default bearer, or being blocked altogether, both of which will prove unacceptable to the end user.

Thus, there exists a need for methods of bearer reservation, maintenance, and use when one or more requested dedicated bearers are unavailable in a communication network.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
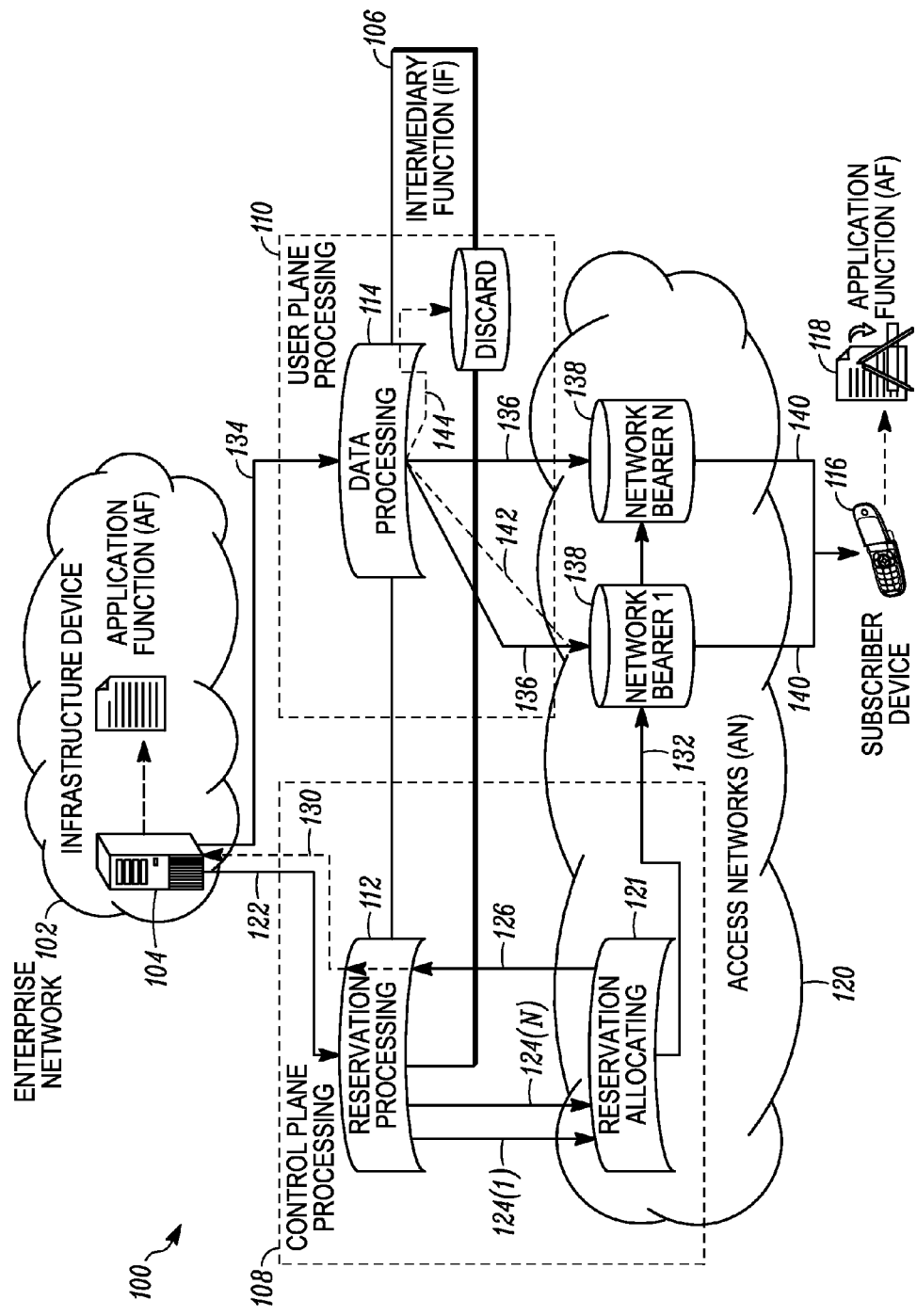
FIG. 1 is a system diagram of a communication system that implements bearer reservation, maintenance, and use when one or more requested allocated bearers are unavailable, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, an intermediary function (IF) performs a method for bearer reservation, maintenance, and use when allocated bearers are unavailable in a communication system. The IF processes a user plane reservation request for a flow of user plane data. In some embodiments, the processing may include receiving a user plane reservation request from a sourcing and/or controlling device, while in other embodiments, the processing may include implicitly generating the user plane reservation request in response to receiving the flow of user plane data from a sourcing device. The IF determines a set of bearers to transport the flow of user plane data. The IF requests from at least one access network the determined set of bearers, and receives from the at least one access network an allocated set of bearers, wherein the allocated set of bearers comprises one or more bearers. The IF receives a user plane data flow from the sourcing device, and associates the user plane data with the allocated set of bearers in order to transport the user plane data to the receiving device. If the IF receives an indication that at least one bearer in the allocated set of bearers is unavailable (e.g. congestion caused the access network to rescind bearers from the allocated set of bearers), the IF prevents at least a portion of the user plane data from being transmitted over the default bearer in accordance with the present disclosure.

Referring now to the drawings, and in particular FIG. 1, a system diagram of a communication system that implements bearer reservation, maintenance, and use when one or more requested allocated bearers are unavailable in accordance with some embodiments, is shown and indicated generally as system 100. System 100 includes an infrastructure device having an application function (AF) 104, wherein the infrastructure device is part of an enterprise network 102. The AF 104 communicates with an AF 116 residing within a subscriber device, wherein the communication takes place over a set (i.e. one or more) of access networks 120.

An enterprise, as the term is used herein, means an organization having infrastructure devices and users of subscriber devices that communicate using the access networks 120, and can be, for example, a Public Safety enterprise or agency or a commercial enterprise, agency or business. Moreover, an enterprise network generally includes infrastructure devices or equipment, such as servers, running various AFs (e.g., AF 104), at the application layer of the Open System Interconnection (OSI) networking model, Internet Protocol (IP) transport equipment, etc. Examples of AFs 104 include, but are not limited to, Push-To-Talk services, Video-on-Demand services, video surveillance services, telephony services, computer aided dispatch (CAD) services, file transfer services, or other application functions which requires dedicated throughput. In this illustrative scenario, the AF 104 may be a streaming media application.

The subscriber device 116 also includes one or more AFs that can be, for example, Push-To-Talk clients, Video-on-Demand clients, video surveillance clients, telephony clients, CAD clients, file transfer clients, or other application functions which require dedicated throughput. In this illustrative scenario, the AF 116 may also be a streaming media application. The subscriber device 116, which is also referred to in the art as user equipment, communication devices, access devices, access terminals, mobile stations, mobile subscriber units, mobile devices, user devices, and the like, can be any type of communication device such as radios, mobile phones, mobile data terminals, Personal Digital Assistants (PDAs), laptops, two-way radios, cell phones, and any other device capable of operating in a wired or wireless environment and that can be used by public users (such as commercial users) or private users (such as public safety users).

The access networks 120 can include one or more access networks in any combination that provide the communication resources over which various media (e.g. audio, video, text, etc.) is transported. Examples of such access networks 120 include, but are not limited to, one or more Radio Access Networks (RANs), including RANs operating according to LTE, UMTS, WiFi, WiMAX, CDMA, eHRPD, or any other suitable standard or proprietary access network implementation.

System 100 further includes a control plane processing block 108 that processes control plane packets or messages. System 100 also includes a user data plane processing block 110 that processes user plane data.

System 100 also includes an IF 106. IF 106 includes a reservation processing function 112 for receiving, processing and generating control plane messages 122, e.g. messages used to maintain network bearers, to and from a controlling application function, and control plane messages 124 to and from a reservation allocating function 121. The IF 106 further includes a data processing function 114 which receives and processes user plane data 134, e.g. media packets or a media stream, from a sourcing AF 104 and directs said user plane data 134 to one or more network bearers 138.

The IF 106 is a logical element of system 100 which can reside as middleware solely in an infrastructure device, such as the server that includes the AF 104, or solely within a different infrastructure device in the enterprise or in the access networks 120 (e.g. in an LTE Evolved Packet Core (EPC) element (such as an eNodeB, a Packet Data Network Gateway, a Policy and Charging Rules Function) or other access network element), or solely within a different standalone infrastructure device, also referred to as an intermediary device. The IF 106 can also reside as middleware in the subscriber device 116. Finally, the IF 106 can be distributed between some combination of subscriber devices and infrastructure devices.

In general, the enterprise infrastructure device 104 (and its associated AF), the access network infrastructure element (e.g. IF 106), and the subscriber device 116 (and its associated AF), are each implemented using a memory (not shown), one or more network interfaces, and a processing device that are operatively coupled, and which when programmed form the means for these system elements to implement their desired functionality, for example as illustrated by reference to FIG. 1-FIG. 6. The network interfaces are used for passing signaling between the elements of the system 100. The implementation of the network interface in any particular element/device depends on the particular type of network, i.e. wired and/or wireless, to which the element/device is connected. Where the network supports wireless communications, the interfaces comprise processing, modulating, and transceiving elements that are operable in accordance with any one or more standard or proprietary wireless interfaces, wherein some of the functionality of the processing, modulating, and transceiving elements may be performed by means of the processing device through programmed logic such as software applications or firmware stored on the memory device of the system element or through hardware.

The infrastructure device 104, the subscriber device 116 and/or the intermediary device (if independently instantiated) may be partially implemented in hardware and thereby programmed with software or firmware logic or code for performing functionality described by reference to FIG. 1-FIG. 6; and/or the infrastructure device 104, the subscriber device 116 and/or the intermediary device (if independently instantiated) may be completely implemented in hardware, for example, as a state machine or application specific integrated circuit (ASIC). The memory implemented by these devices can include short-term and/or long-term storage of various information needed for the functioning of the respective devices. The memory may further store software or firmware for programming the device with the logic or code needed to perform its functionality.

Also, an understanding of some of the terms used herein will assist in understanding the teachings in accordance with the present disclosure. As used herein, the term bearer or bearer resource is defined as a transmission path in a network (such as a RAN) and is used to carry user place data (also termed, herein, as communications, media packets, media streams, or service data flows (SDFs)). A bearer can be bidirectional, i.e., having both an uplink path from the subscriber device to the infrastructure device and a downlink path from the infrastructure device to the subscriber device; or a bearer can be unidirectional, i.e., having either an uplink path from the subscriber device to the infrastructure device or a downlink path from the infrastructure device to a single subscriber device (point-to-point (PTP)) (such as an allocated bearer or a default bearer) or to a group of subscriber devices (point-to-multipoint (PTM)) for broadcast or multicast traffic. A bearer has associated therewith a set of QoS, characteristics or attributes such as, but not limited to, a particular throughput, bit rate, scheduling priority, admission priority, maximum latency, maximum packet loss rate, etc. The priority level of a bearer may be ultimately determined or quantized based on one or more QoS parameters. In the case of an LTE network, such QoS parameters may include the Allocation and Retention Priority (ARP) and QoS Class Identifier (QCI), which are typically specified in a set of policy rules (e.g. Policy and Charging Control (PCC)) rules.

One type of bearer is a Guaranteed Bit Rate (GBR) bearer. A Guaranteed Bit Rate (GBR) bearer provides a minimum guaranteed throughput (in terms of bits-per-second). The GBR bearer may also be associated with a maximum bit rate, which is greater than or equal to the minimum guaranteed throughput. The network may attempt to guarantee the maximum bit-rate in non-congested situations. A GBR bearer may also be associated with other characteristics, such as a maximum packet-loss-rate, packet latency, and scheduling priority. Another type of bearer is a non-GBR bearer which, when allocated, provides other quality guarantees, such as priority and/or maximum latency, but does not guarantee available throughput. A default bearer is defined as a non-GBR bearer that provides for "best effort" transmission and is allocated to a subscriber device for the duration of its attachment to the access networks 120. By default, any user plane data that is not transferred across an allocated bearer is transferred across the default bearer. A dedicated or allocated bearer is defined as any additional bearer that is established for that same subscriber device and is specifically requested by (or on behalf of) the device and can be either non-GBR or GBR.

Figure 4:
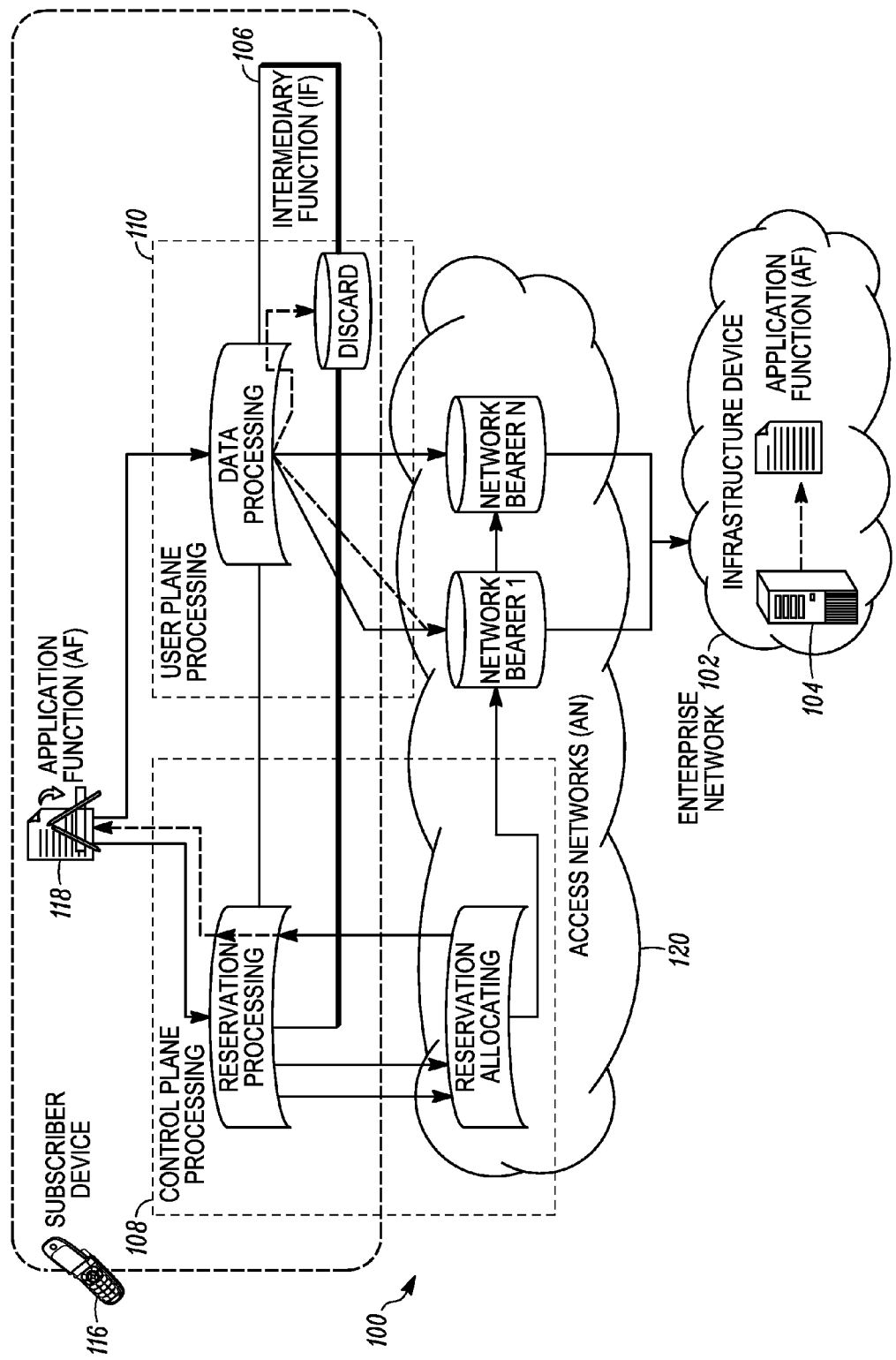
FIG. 4 is an alternative system diagram of a communication system that implements bearer reservation, maintenance, and use when one or more requested allocated bearers are unavailable, in accordance with some embodiments.
Figure 5:
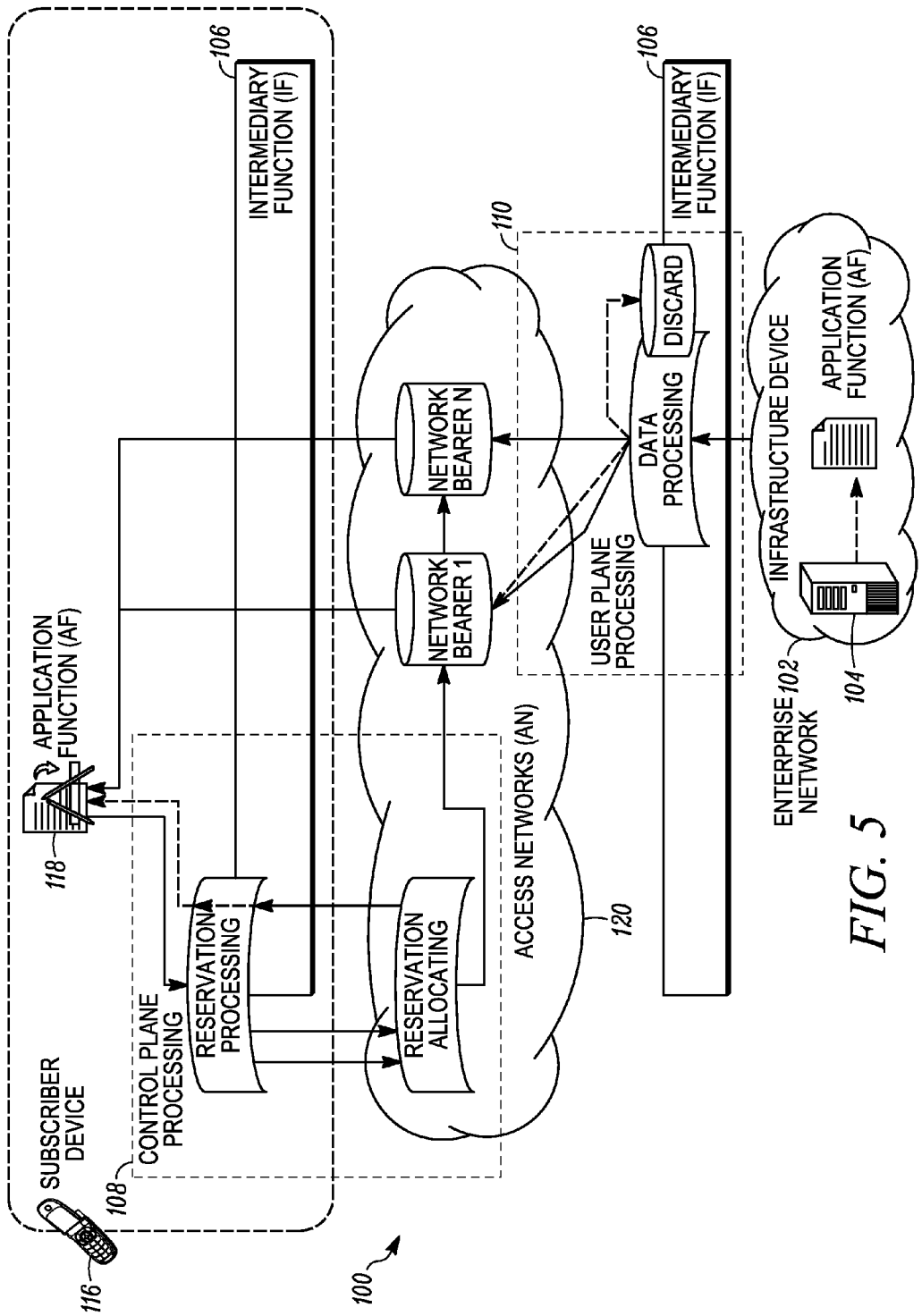
FIG. 5 is another alternative system diagram of a communication system that implements bearer reservation, maintenance, and use when one or more requested allocated bearers are unavailable, in accordance with some embodiments.
Figure 6:
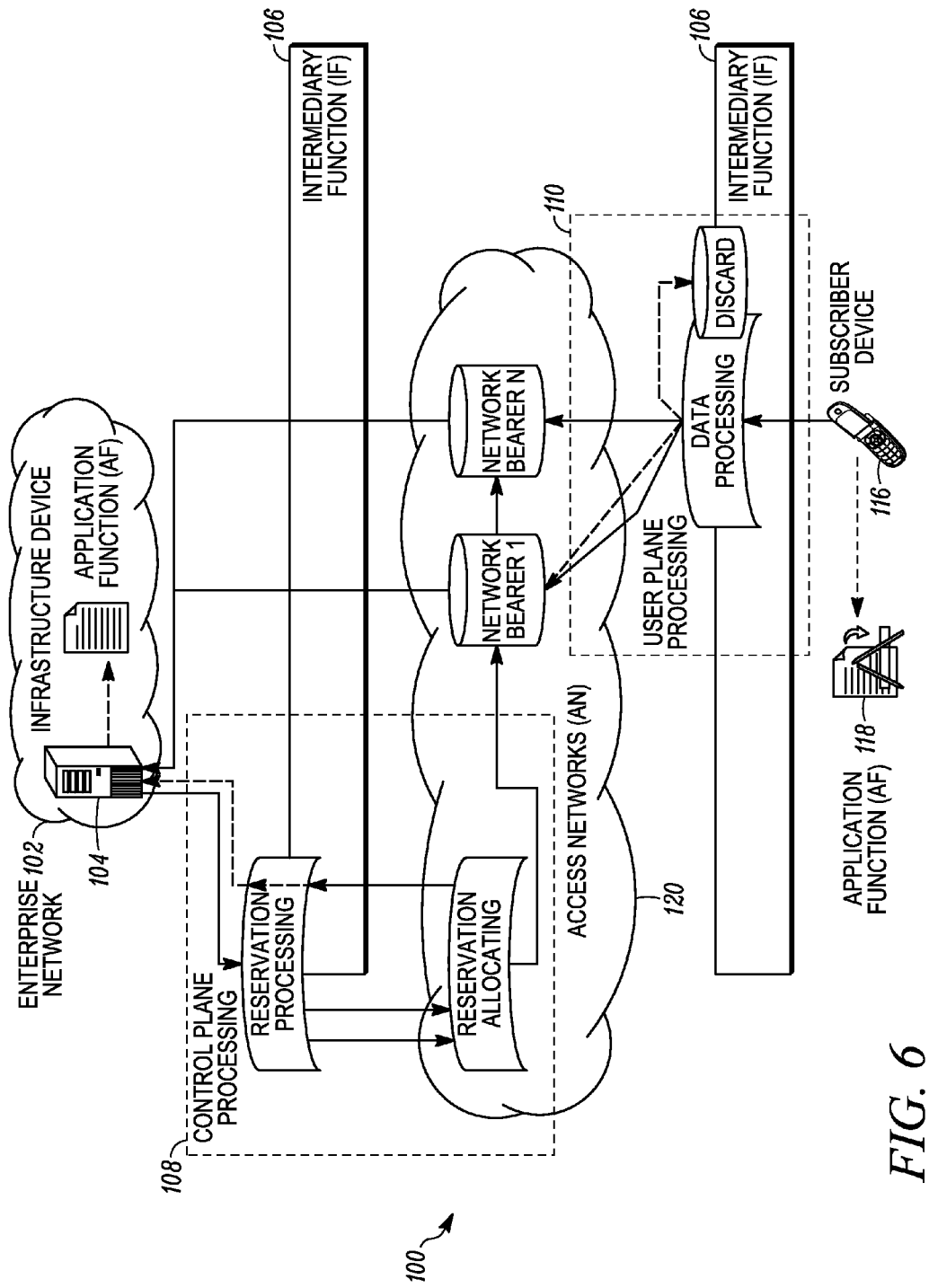
FIG. 6 is yet another alternative system diagram of a communication system that implements bearer reservation, maintenance, and use when one or more requested allocated bearers are unavailable, in accordance with some embodiments.

A controlling AF is defined as an AF that provides control plane messages to the reservation processing function 112 of the IF 106. The sourcing AF is defined as an AF that provides user plane data, e.g. media packets, to the data processing function 114 of the IF 106. A receiving AF is defined as the AF that receives the user plane data, e.g. media packets, from the sourcing AF. In some embodiments disclosed herein (e.g. as shown in FIGS. 1 and 5), the sourcing AF resides in an infrastructure device in the enterprise network, and the receiving AF correspondingly resides in a subscriber device. In other embodiments disclosed herein (e.g. as shown in FIGS. 4 and 6), the sourcing AF resides in the subscriber device, and the receiving AF correspondingly resides in the infrastructure device 104 in the enterprise network. It should also be noted that in yet other embodiments, the controlling AF and the sourcing AF may reside in the same device.

A flow of user plane data is defined to be an associated stream of user plane data packets. A user plane data sub-flow is defined to be a subset of the packets comprising a user plane data flow.

Alternative processing is defined as processing that is performed instead of sending user plane data over a default bearer, while one or more allocated and/or requested bearers are unavailable. The indication that at least one of the bearers is unavailable can be an indication that fewer than the requested number of bearers can be allocated or an indication that at least one allocated bearer, in response to congestion or other triggers, has been rescinded by the network. The alternative processing (i.e. alternative to using the default bearer to transport the user plane data) can include, in any combination, one or more of: notifying the controlling AF that the request to allocate a bearer is denied; periodically resending the reservation requests for the requested bearers that were unavailable; discarding at least some of the user plane data packets; or redirecting at least some of the user plane data packets to an allocated bearer which is still available.

Turning now to a description of the signaling passed between devices in system 100 to reserve and manage a plurality of bearers for transporting media from a sourcing AF (shown in FIG. 1 as the infrastructure device 104) to a receiving AF (shown in FIG. 1 as the subscriber device 116). It should be noted that any suitable signaling (standardized, proprietary, or some combination of the two) can be realized to implement the control plane and user plane signaling dependent on the protocol and the access networks used by the devices in the system. When the proposed disclosure is realized in a LTE network, the interface from the controlling AF to the reservation processing function 112 of the IF 106 may conform to the Rx signaling standard. The interface from the reservation processing function 112 of the IF 106 to the reservation allocating function 121 in the access networks 120 for the purpose of managing network bearers may conform to the Rx signaling standard. In a LTE network, the reservation allocating function may be a PCRF. As such, in some embodiments, the process of requesting a bearer allocation between the IF and the LTE network may follow standard LTE bearer request behavior. Accordingly, the IF may not explicitly request the bearer allocation, but rather implicitly request it from the PCRF per standard Rx interface behaviors.

In various embodiments of this the present disclosure, messages 122, 124, 126 and 130 can be carried over Diameter messages such as, but not limited to, Application Authorization Request (AAR), Application Authorization Answer (AAA), Re-Authorization Request (RAR), Re-Authorization Answer (RAA), Credit Control Request (CCR), Credit Control Answer (CCA) etc., with appropriate Attribute Value Pairs (AVPs) to include the relevant information such as information pertaining to requested bearer (QoS attributes, throughput requirement, Flow Identification etc.), status of a request, status of a bearer, failure to establish a given bearer, rescinding of a given bearer, modification of a given bearer, etc.

Figure 2:
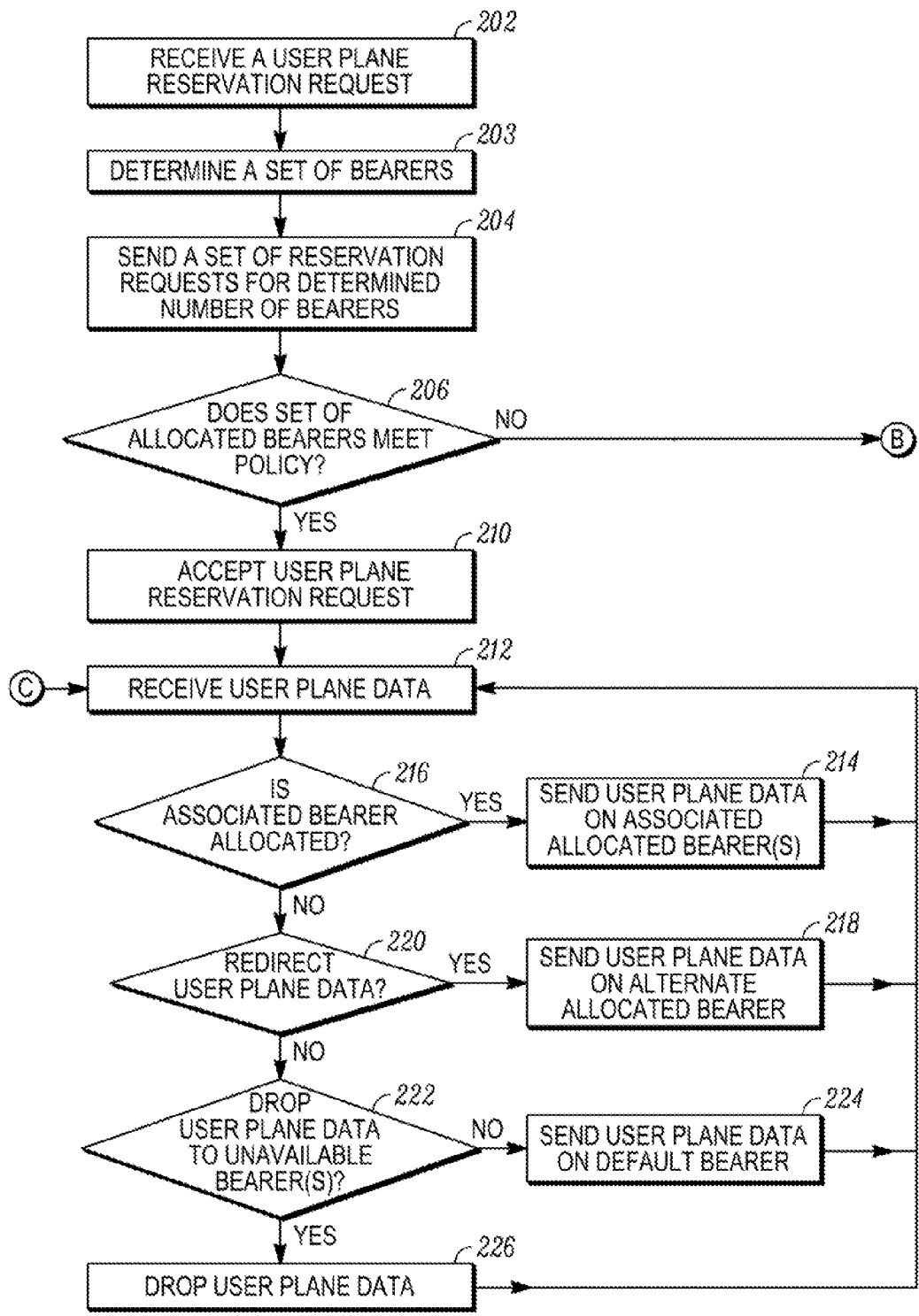
FIG. 2 is a flow diagram of a method for alternative control plane and data plane processing when one or more requested allocated bearers are unavailable, in accordance with some embodiments.

Turning now to FIG. 2, a flow diagram of a method for alternative control plane and user plane processing when one or more requested and/or allocated bearers are unavailable, in accordance with some embodiments is shown and generally indicated at 200. Method 200 describes both the control plane processing block 108 and the user plane processing block 110 of the IF 106 and is described by reference to the interfaces superimposed on the system diagram shown in FIG. 1.

Beginning at step 202 of method 200, the reservation processing function 112 receives from a controlling application function (in this case AF 104) a user plane reservation request 122 to allocate a flow of user plane data for a sourcing application function (also in this case the AF 104) to send user plane data (e.g. media) to the receiving AF 116. Associated with the user plane reservation request may be QoS requirements (e.g. a minimum and maximum throughput, intermediate bit rates, priority, etc.), and an optional flag indicating if at least a portion of the user plane data should be discarded instead of being redirected to the default bearer. In one embodiment, where the controlling AF resides in the enterprise network, and the intermediary function resides in an LTE network element such as the PCRF, the request 122 is sent over the Rx interface that is defined by 3GPP standards body. Similarly, any suitable standard or proprietary signaling can be used by the AF 104 to communicate the user plane reservation request 122. From the perspective of the controlling AF, the request 122 is for a flow of user plane data, optionally having sufficient. QoS, to transport the user plane data from the sourcing AF 104 to the receiving AF 116 using the access networks 120. In another embodiment (not shown), the AF 116 does not explicitly communicate a user plane reservation request to the IF 106. Rather, the IF 106 may implicitly generate a user plane reservation request in response to receiving a flow of user plane data from AF 104.

The AF 104 may be pre-configured with a table of desired QoS requirements for a set of known sourcing application functions. Processing of a flow of user plane data by the AF 104 may cause the AF to select or approximate a corresponding set of QoS requirements.

Returning to method 200, in step 203, upon processing the user plane reservation request 122, the reservation processing function 112 can determine a set of bearers which may satisfy the QoS requirements specified in user plane reservation request 122.

In step 204, upon determining a set of bearers, the IF attempts to reserve the determined set of bearers. The reservation processing function 112 generates a corresponding number (1 to N) of reservation requests 124 that it sends to the reservation allocating function 121 in one or more access networks 120. In one embodiment, where the reservation processing function 112 of the IF 106 resides in the enterprise network, and the reservation allocating function 121 of the access network 120 resides in an LTE network device, such as the PCRF, the request 124 is sent over the Rx interface that is defined by the 3GPP standards body. In another embodiment, where the reservation processing function 112 of the IF 106 resides in an LTE network device such as the PCRF, and the reservation allocating function 121 of the access network 120 resides in another LTE network element such as the Packet Data Network Gateway, the request 124 is sent over the Gx interface that is defined by the 3GPP standards body. Thus, each reservation request 124 is for a single bearer resource in one of the access networks, wherein all of the reservation requests 124 can be directed to the same access network or to a combination of different access networks.

To affect the order in which the allocated bearers are rescinded or reinstated, bearers may be requested with specific priorities. The first (highest priority) bearer may be marked as being not vulnerable to preemption (i.e. to ensure it remains allocated, if possible), along with the ability to preempt other bearers marked as vulnerable to preemption (i.e. indicating the first bearer should preempt other preemptable bearers, such as secondary, tertiary, and lower priority bearers of other user plane data). Other secondary, tertiary, and lower priority bearers may be marked as being vulnerable to preemption (i.e. indicating that the first bearers of other user plane data may preempt this bearer, if necessary). In addition, bearer priority can be specified in multiple dimensions, including "allocation and retention policy" and "scheduling priority."

Not all bearer requests require GBR service. Two bearers may be GBR, while another may be non-GBR with, for example, a low-latency requirement. Further, the same 'latency' requirement may be imposed on all bearers to ensure that packets arrive on-time, and roughly in order.

In response to receiving the bearer reservation requests 124, the reservation allocating function 121 of the access network(s) 120 indicates through signaling 126 to the reservation processing function 112 how many, if any, of the requested bearers have been allocated (i.e. the allocated set of bearers). Please note that the desired number of bearers vs. the allocated number of bearers may not be equal, dependent on network capacity at the time the user plane reservation request is processed. Returning to method 200, in step 206, the IF 106 then uses any suitable method to determine whether the allocated set of bearers adheres to a configured policy (which may be inclusive of the QoS requirements specified in the user plane reservation request 122). If the allocated set of bearers meets the policy, the IF 106 accepts (210) and processes the user plane reservation request 122. Obviously, if the access network grants the reservation requests 124 in their totality, the policy is met. Otherwise, the invention determines the alternative processing performed by the IF 106 (in lieu of using the default bearer or outright rejecting the user plane reservation request) in the event that less than all of the requested bearers are allocated (i.e. when the access network(s) indicate or communicate to the IF 106 that one or more of the requested bearers is unavailable for allocation). The alternative processing is indicated in FIG. 3 as connector element "B" that leads to method 300 of FIG. 3.

Figure 3:
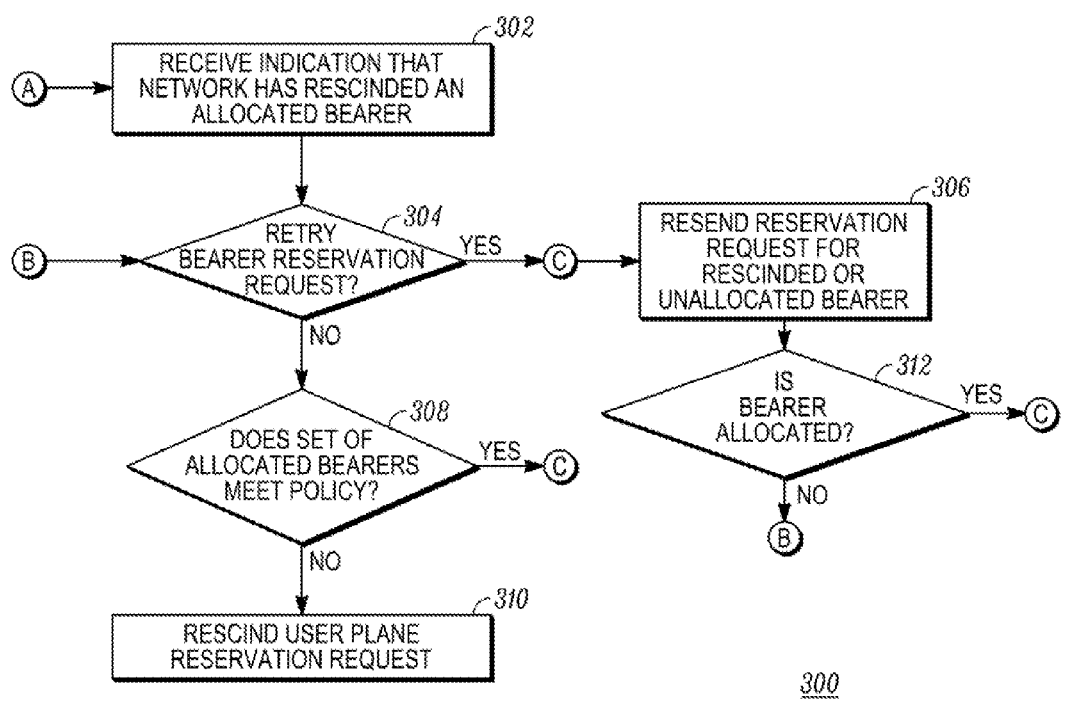
FIG. 3 is a flow diagram of a method for alternative control plane processing when one or more requested allocated bearers are unavailable, in accordance with some embodiments.

Turning momentarily to method 300 indicated in FIG. 3, the IF 106 may use a configured policy to determine appropriate alternative processing. For example, the IF 106 may determine (304) whether to periodically resend the bearer reservation requests for the bearers that were unavailable or unallocated at the time the user plane reservation request 122 was processed. If the IF 106 is configured to resend the bearer reservation (306), an appropriate request is sent from the reservation processing function 112 to the appropriate reservation allocating function 121 in the appropriate access network 120. Notably, the bearer reservation requests are continually resent without requiring any intervention by the controlling AF 104. This is useful, for example, when the controlling AF is not aware of the IF 106. In certain embodiments, the successful allocation (312) of a bearer is indicated to the AF 104 by IF 106 via signaling 130. If the IF 106 is not configured to retry the bearer reservation (308), the bearer allocation request 122 is rejected or denied (310) with the denial optionally indicated to the controlling AF 104.

Turning back to FIG. 2, let us assume for the moment that the allocated set of bearers provided in response to the user plane reservation request has met the required criteria, and the user plane resource request 122 was accepted at 210, resulting in the reservation processing function 112 establishing bearers 1 to N 138 in the appropriate access networks 120.

At some point in time (as indicated by the connector "C" in FIG. 2), the sourcing AF (e.g. AF 104 in this case) may start to send user plane data (e.g. media packets) 134 that are received at the IF 106, as indicated in step 212. A single flow of user plane data (e.g. an encoded stream of media packets) from a sourcing AF is then divided for traversal across this plurality of allocated bearers. Pursuant with some embodiments, the data processing function 114 first divides or de-multiplexes the received media packets into a plurality of user plane data sub-flows 136. The IF 106 maps the plurality of user plane data sub-flows 136 onto the plurality of allocated bearers 138 such that each of the allocated bearers 138 transports one or more user plane data sub-flows 136 to the subscriber device 116. To facilitate this, the IF will associate certain packets from the sourcing AF with certain allocated bearers. This association may be performed via any number of means, for example, randomly (e.g. every other packet), intelligently based on the perceived contribution of the packet to the reproduced media quality, or it may be performed based on explicit packet markings as noted by the sourcing AF.

For each user data plane packet received, the IF 106, at step 216, determines if the bearer associated with current packet of user plane data has been allocated. If the associated bearer has been allocated (214), the IF 106 marks the packet 136 for transmission on the associated bearer 138 and sends it to the appropriate access network 121.

If the IF 106 has determined that the associated allocated bearer was rescinded (220), it now determines the alternative processing in view of this rescinded bearer. In one embodiment, the IF 106 uses a configured policy to determine alternative processing of media packets instead of using the default bearer. For example, the IF 106 can decide at 220 to redirect the packet and send it onto one or more of the remaining or existing allocated bearers at 218. In one embodiment, when the access network is LTE, the IF may have to alter the PCC rules to redirect traffic to other bearers. Alternatively, the IF may decide at 222 to drop (226) the packet intended for the rescinded bearer, or temporarily send (224) the packet on the default bearer.

A some subsequent time (as indicated by the connector "A" in FIG. 3), one or more access networks may rescind one or more of the allocated bearers and provide an indication that is received (302) at the IF 106. In one embodiment, the IF 106 uses a configured policy to determine appropriate alternative processing. For example, the IF 106 may first send an indication of the bearer revocation to the controlling AF 104. The IF 106 then determines (304) whether to periodically retry (306) establishment of the rescinded bearer with the reservation allocating function 121 in the appropriate access networks 120. If the bearer allocation is to be retried, the IF 106 continues to process user plane data following the sequence shown in FIG. 2 starting at connector "C". If and when a bearer is successfully reallocated, the IF 106 may send an indication to the controlling AF 104. If the IF 106 is not to retry the bearer reservation, a configured policy is consulted. If the currently allocated set of bearers meets the criteria of the policy, the IF 106 follows the connector "C" back to the process flow in FIG. 2. If the currently allocated set of bearers does not meet the criteria of the policy, the IF 106 rescinds (310) the user plane reservation request.

The IF 106 manages this plurality of bearer reservations as a logical group, linked to the AF's 104 user plane reservation request. Changes to the AF's 104's user plane reservation request (including a request for its release) may affect some or all of the linked set of allocated network bearers.

As stated earlier, in various embodiments, the sourcing application function resides in an infrastructure device within the enterprise network and the client application function resides within the subscriber device. In other embodiments the sourcing application function resides in the subscriber device and the client application function resides within an infrastructure device in the enterprise network or access network. Moreover, the intermediary function can be: coupled solely to or reside completely in an infrastructure device of the enterprise network; coupled solely to or reside completely in the subscriber device; or distributed between the two. In FIG. 1, the sourcing application function resided in infrastructure device in the enterprise network 102, and both control plane processing and data plane processing of the intermediary function 106 resided with the infrastructure device in the enterprise network 102.

In FIG. 4 the sourcing application function resides in the subscriber device 116, the receiving application function resides in the infrastructure device of enterprise network 102, and both control plane processing 108 and user data plane processing 110 of the intermediary function 106 reside within subscriber device 116. In FIG. 5, the sourcing application function resides in an infrastructure device in the enterprise network 102, the receiving application function resides in the subscriber device 116. However the control plane processing 108 of the IF 106 is controlled by the subscriber device 116, and the user plane processing 110 of the IF 106 is controlled by the infrastructure device in the enterprise network 102. Finally, In FIG. 6 the sourcing application function resides in the subscriber device 116, the receiving application function resides in the infrastructure device of enterprise network 102. However, the control plane processing 108 of the IF 106 is controlled by the infrastructure device in the enterprise network 102, and the user plane processing 110 of the IF 106 is controlled by the subscriber device 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for bearer reservation, maintenance, and use when one or more requested and/or allocated bearers are unavailable in a communication network described herein. The non-processor circuits may include, but are not limited to, a radio receiver, a radio transmitter, signal drivers, clock circuits, power source circuits, and user input devices. As such, these functions may be interpreted as steps of a method to perform the bearer reservation, maintenance, and use when one or more requested and/or allocated bearers are unavailable in a communication network described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g. comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for bearer reservation, maintenance, and use in a communication system, the method comprising:
    an intermediary function performing:
       processing a user plane reservation request for a flow of user plane data from a sourcing device;
       determining a set of bearers to transport the flow of user plane data;
       requesting from at least one access network the determined set of bearers;
       receiving from the at least one access network an allocated set of bearers, wherein the allocated set of bearers comprises one or more bearers;
       receiving the flow of user plane data from the sourcing device;
       assigning portions of the flow of user plane data to one or more bearers in the allocated set of bearers;
       receiving an indication that at least one bearer in the allocated set of bearers is unavailable; and
       preventing the portion of the flow of user plane data assigned to the at least one unavailable bearer from being transmitted over the default bearer.

2. The method of claim 1, further comprising associating the flow of user plane data with the allocated set of bearers in order to transport the user plane data to a receiving device.

3. The method of claim 1 further comprising dividing the user plane data into a plurality of user plane data sub-flows.

4. The method of claim 1, after receiving the indication that at least one of the allocated bearers is unavailable, further comprising:
    receiving an indication that a first bearer of the allocated set of bearers has been rescinded; and
    redirecting at least a portion of the user plane data for transport on at least one of the remaining bearers in the allocated set while the rescinded first bearer is unavailable.

5. The method of claim 1, after receiving the indication that at least one of the allocated bearers is unavailable, further comprising:
    receiving an indication that a first bearer of the allocated set of bearers has been rescinded; and
    discarding at least a portion of the user plane data while the rescinded first bearer is unavailable.

6. The methods of claim 5 wherein the decision to discard at least a portion of the user plane data is controlled by an indication included in the user plane reservation request.

7. The method of claim 5 wherein the decision to discard at least a portion of the user plane data while the rescinded first bearer is unavailable is preconfigured.

8. The method of claim 1, after receiving the indication that at least one of the allocated bearers is unavailable, further comprising:
    receiving an indication that a first bearer of the allocated set of bearers has been rescinded; and
    periodically resending the reservation request for the rescinded first bearer while the first bearer remains unallocated.

9. The method of claim 1, after receiving the indication that at least one of the allocated bearers is unavailable, further comprising:
    receiving an indication that a first bearer of the allocated set of bearers has been rescinded; and
    notifying the controlling application function that the allocated set of bearers has been modified.

10. The method of claim 1 further comprising notifying the controlling application function that the allocated set of bearers is less than the determined set of bearers.

11. The method of claim 1 further comprising periodically sending a reservation request to the set of networks to allocate a bearer that was previously unallocated.

12. The method of claim 11 further comprising:
    receiving a notification that the bearer that was previously unallocated has now been allocated; and
    notifying the controlling application function that the allocated set of bearers has been modified.

13. The method of claim 1 further comprising assigning a priority level to at least one of the bearers in the allocated set of bearers.

14. The method of claim 1, wherein the allocated set of bearers is associated with the user plane reservation request.

15. The method of claim 14, further comprises processing a release of the user plane reservation to release all the bearers in the allocated set of bearers.

16. The method of claim 1, wherein the processing of a user plane reservation request comprises implicitly generating a user plane reservation request in response to the flow of user plane data received from the sourcing device.

17. The method of claim 1, wherein the user plane reservation request comprises at least one quality of service characteristic of the user plane data.

18. The method of claim 1 further comprising using the flow of user plane data to determine at least one quality service characteristic of the user plane data.

19. The method of claim 1, wherein the step of processing the user plane reservation request comprises receiving a user plane request from a controlling application function of a source device.

20. The method of claim 1, wherein the flow of user plane data comprises a plurality of packets and wherein preventing the portion of the flow of user plane data assigned to unavailable bearers of the set of allocated bearers from being transmitted over the default bearer comprises dropping packets assigned to the unavailable bearers.

21. A method for bearer reservation, maintenance, and use in a communication system, the method comprising:
an intermediary function performing:
processing a user plane reservation request for a flow of user plane data from a sourcing device;
determining a set of bearers to transport the flow of user plane data;
requesting from at least one access network the determined set of bearers;
receiving from the at least one access network an allocated set of bearers, wherein the allocated set of bearers comprises a plurality of bearers;
receiving the flow of user plane data from the sourcing device;
in response to receiving the flow of user plane data from the sourcing device, dividing the flow of user plane data such that a portion of the flow of user plane data traverses across each bearer of the plurality of bearers;
receiving an indication that at least one bearer of the plurality of bearers is unavailable; and
preventing the portion of the flow of user plane data associated with the at least one unavailable bearer from being transmitted over the default bearer.

22. The method of claim 20, wherein the flow of user plane data comprises a plurality of packets and wherein dividing the flow of user plane data comprises:
dividing the received packets into a plurality of user plane data sub-flows; and
mapping the plurality of user plane data sub-flows onto the plurality of bearers.

23. The method of claim 22, wherein preventing the portion of the flow of user plane data assigned to unavailable bearers of the set of allocated bearers from being transmitted over the default bearer comprises dropping packets assigned to the unavailable bearers.

* * * * *

UNITED STATES PATENT AND TRADEMARK OFFICE
CERTIFICATE OF CORRECTION

PATENT NO. : 8,774,207 B2
APPLICATION NO. : 13/194378
DATED : July 8, 2014
INVENTOR(S) : Tyrone D. Bekiares et al.

It is certified that error appears in the above-identified patent and that said Letters Patent is hereby corrected as shown below:

ON THE TITLE PAGE:

On Page 2, in Item (56), under "OTHER PUBLICATIONS", in Column 2, Line 3, delete "TS 29.274 9.1.0," and insert -- TS 29.274, ver. 9.1.0, --, therefor.

IN THE SPECIFICATION:

In Column 1, Line 26, delete "(3GPP))" and insert -- (3GPP) --, therefor.

In Column 6, Line 61, delete "sufficient. QoS," and insert -- sufficient QoS, --, therefor.

In Column 8, Line 60, delete "access network 121." and insert -- access network 120. --, therefor.

Signed and Sealed this
Tenth Day of May, 2016

Michelle K. Lee
*Director of the United States Patent and Trademark Office*